(No Model.)
F. W. MILLER.
BEAN HARVESTER.
No. 452,440. Patented May 19, 1891.
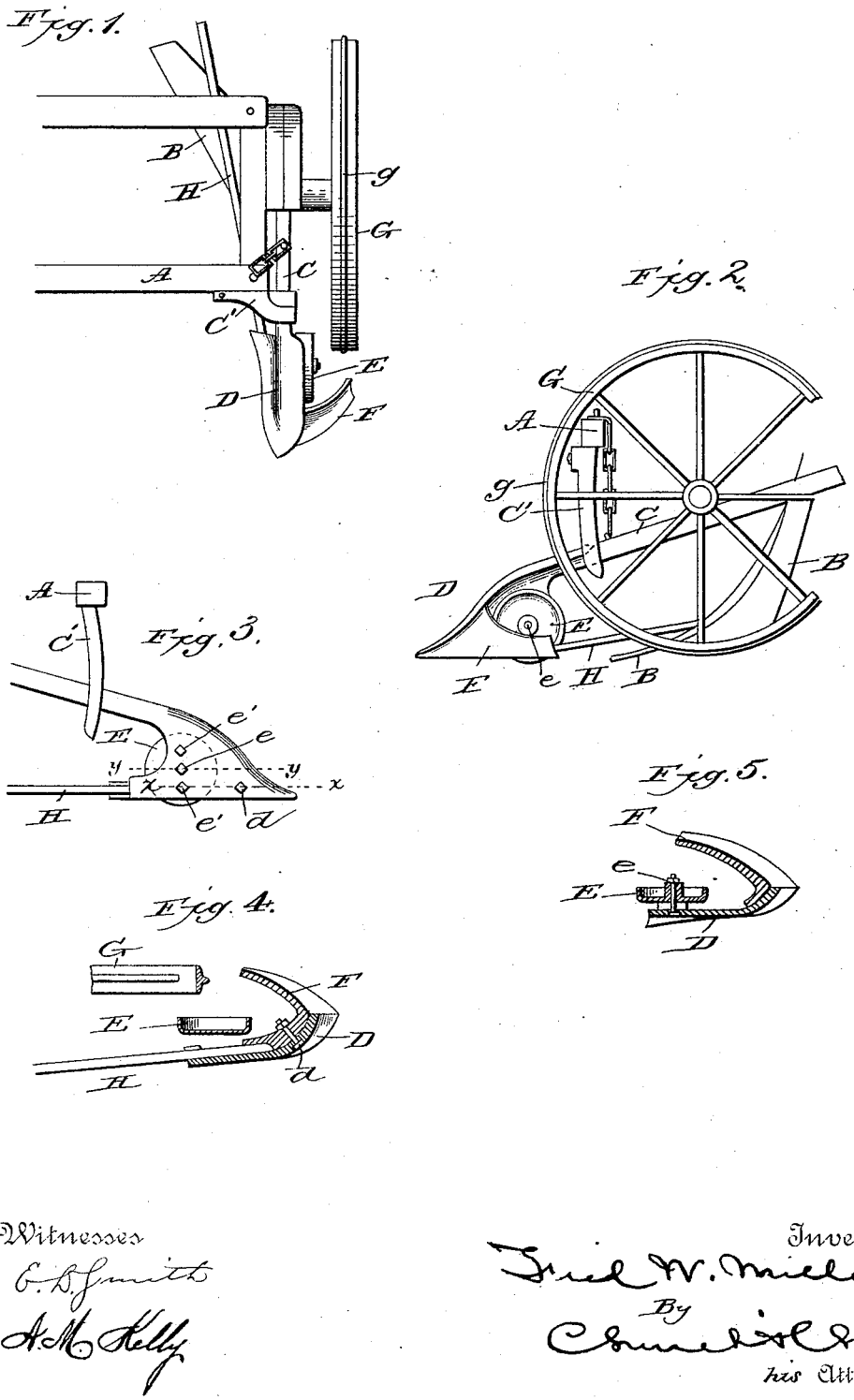

UNITED STATES PATENT OFFICE.

FRED W. MILLER, OF CALEDONIA, NEW YORK.

BEAN-HARVESTER.

SPECIFICATION forming part of Letters Patent No. 452,440, dated May 19, 1891.

Application filed September 29, 1890. Serial No. 366,600. (No model.)

*To all whom it may concern:*

Be it known that I, FRED W. MILLER, of Caledonia, Livingston county, and State of New York, have invented certain Improvements in Bean-Harvesters; and I do hereby declare the following to be a full, clear, and exact description of the same, reference being had to the accompanying drawings, forming a part of this specification, and to the letters of reference marked thereon.

My present invention relates to improvements on the bean-harvester shown in Letters Patent No. 345,981, granted me July 20, 1886, and has for its objects to improve the construction of the vine-lifter and facilitate the application of the gathering-rod thereto.

In the accompanying drawings, Figure 1 is a top plan view of one side of a machine, showing the application of my invention; Fig. 2, a side view of the same; Fig. 3, a sectional view showing the inside of the vine-lifter; Fig. 4, a section on the line $x$ $x$ of Fig. 3, and Fig. 5 a section on the line $y$ $y$ of Fig. 3.

Similar letters of reference in the several figures denote similar parts.

The letter A indicates the frame of the machine, carrying the blades or shares B, and C the arms pivoted to the frame at the rear, as in the before-mentioned patent, and provided at the forward ends with shares or vine-lifting shoes D, preferably formed integral with the arms and projecting over and partially covering the small wheels E, which carry the vine-lifters and run on the surface of the ground. To the vine-lifters D are secured wings or guards F, projecting outward in front of the carrying-wheels G of the machine and serving to clear stones or clods from in front of said wheels and move them out of the way, thereby insuring the machine being evenly supported and the shares B running at an even depth in the ground. These wings F are preferably constructed, as shown, of a single piece or casting, the inner portion passing inside of the shoes D and secured by a bolt $d$, passing through both parts, as shown. The gathering-rods H, extending from the rear of the vine-lifters, instead of being rigidly secured therein, as heretofore, are made removable and are secured in a socket $d'$, formed in the shoes or lifters, by extensions on the inner ends of the wings F, as in Fig. 4, which project over the ends of the rods, and when the wings are secured by bolts $d$ securely clamp and hold said rods in place.

The wheels E are mounted upon bolts $e$, passing through one of a series of holes $e'$ in the shoes D, as shown, and, as will be understood, support said shoes and serve to carry them along on top of the ground. The bolt may be placed in any of the holes, thereby varying the height of the shoes.

The wheels G of the machine are provided with the circumferential rib $g$, which in operation enters the ground and prevents the machine moving sidewise, as it now tends to do, thereby keeping the shares B in proper position all the time, and this I regard as a valuable feature not only in this but in any kind of machine that has a tendency to move sidewise.

The forward portions of the arms C, carrying the shoes, are guided in slotted guides C', secured to the main frame, as shown.

The operation of the various parts will be understood from the foregoing and my prior patent referred to, and therefore no further description is necessary.

I claim as my invention—

In a bean-harvester, the combination, with the main frame, the supporting-wheel G, and the pivoted arm having the shoe on the end, of the guard projecting in front of the wheel, the gathering-rod inserted in a socket in the shoe and clamped in position by the said guard, and the bolt for securing the latter in position, substantially as described.

FRED W. MILLER.

Witnesses:
 FRED F. CHURCH,
 ELISHA NORTON.